(No Model.)
F. M. YOUNG.
PROCESS OF MAKING WHISKY.
No. 314,096. Patented Mar. 17, 1885.
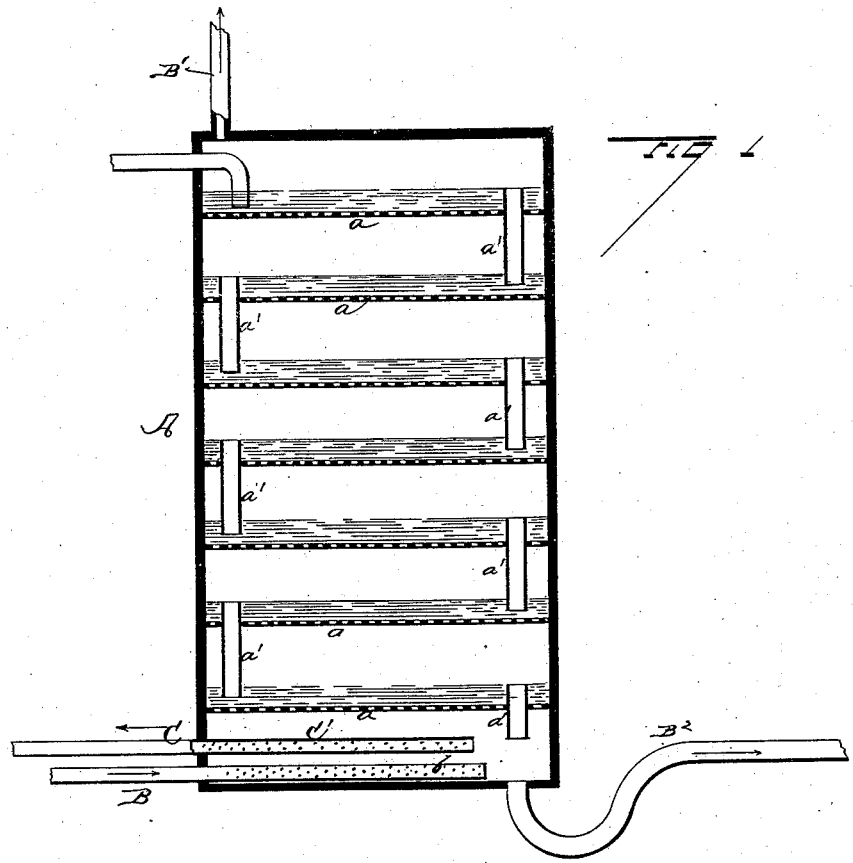
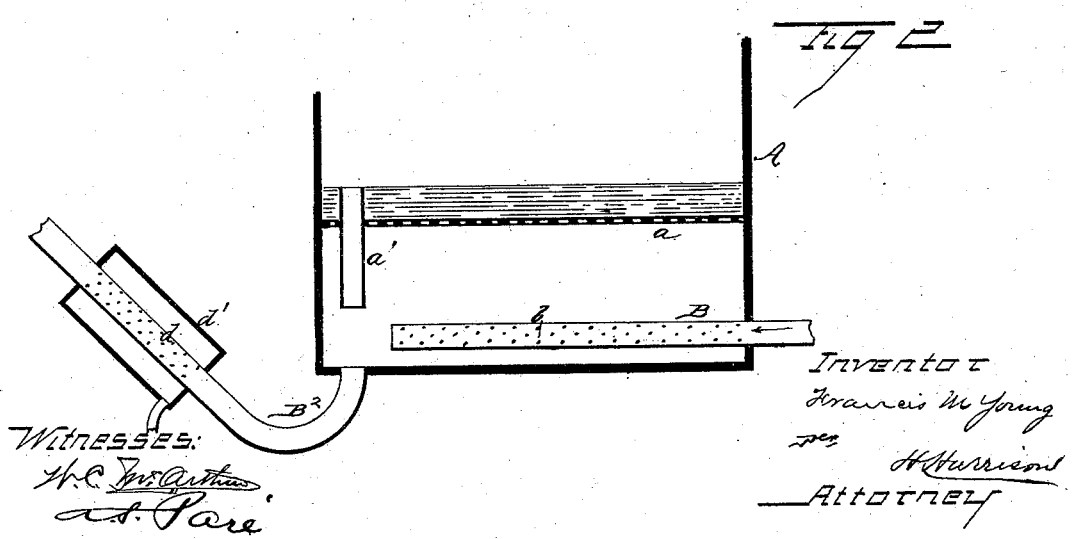

UNITED STATES PATENT OFFICE.

FRANCIS M. YOUNG, OF CHICAGO, ILLINOIS.

PROCESS OF MAKING WHISKY.

SPECIFICATION forming part of Letters Patent No. 314,096, dated March 17, 1885.

Application filed December 29, 1884. (No model.)

*To all whom it may concern:*

Be it known that I, FRANCIS M. YOUNG, a citizen of the United States, residing at Chicago, in the county of Cook and State of Illinois, have invented certain new and useful Improvements in Processes for Making Whisky, of which the following is a specification, to wit:

This invention relates to processes for the manufacture of whisky; and it consists in separating the bran, chaff, and other heavy particles of "slop" from the "spent beer" under pressure, substantially as will be hereinafter more fully described and claimed.

In order to enable others skilled in the art to which my invention appertains to make and use the same, I will now proceed to describe it, referring to the accompanying drawings, in which—

Figure 1 represents a vertical section of a still, showing one means of carrying my invention into practice; and Fig. 2, a modification of the same.

A represents a still of the usual form, provided with a series of perforated divisions, $a\ a$. These divisions separate the still into several compartments, which are connected on opposite or alternate sides by small pipes $a'$, the upper ends of which rise somewhat above the perforated division-plate in order that the "mash" fed into the upper end of the still by the pipe A' may rest to a given depth upon each plate $a$ before it overflows into the next compartment.

To the lower end of the still is connected a steam-supply pipe, B, which may be simply connected to the side of the still and there terminate, but which I prefer to extend into the still, as shown in Fig. 1, and provide with perforations $b$, which admits of the steam being evenly distributed through the mash which rests upon and around the pipe in the lower compartment. The steam admitted by this pipe rises through the perforated division-plates and the mash in each compartment, and escapes through a pipe, B', at the top. To the lower end of the still is also connected a pipe, B², by which the bran, chaff, and other heavy particles of the slop are conducted off to any convenient point or receptacle for further disposition, as may be desired.

The liquid or spent beer it is important to save and separate from the other portion of the slop, as it contains valuable ingredients in solution, which are of great use in the manufacture of whisky, and their value increases with the amount it is possible to separate from the heavier particles. This separation I find to be much better accomplished while the mass is in a heated state and under pressure, and one means of accomplishing it is illustrated in the drawings, where a pipe, C, is connected to the still at its lower end, the end of which pipe projects within the lower compartment, as at C', above the perforated steam-supply pipe. This end C' is perforated or reticulated to permit the passage of the liquid, but to prevent the passage of the heavier particles of the slop, and thus effectually strain the slop before it leaves the still.

When the mash is passing through the still, the steam passing in through the pipe B permeates and agitates the mass in the lower compartment, thus serving to effectually keep the particles in suspension in the liquid, while also preventing the heavy particles from settling around the perforated or reticulated straining-pipe so as to clog its action. The steam also exerts a pressure in the still, which aids materially in separating the slop from the spent beer, and forces both off through their separate pipes.

The particular kind of apparatus used in carrying out this process is not material, and I do not desire to confine myself to any particular devices; but I find that shown in Fig. 1 to be well adapted to the purpose in view. A modification of this is shown in Fig. 2, in which the waste-pipe B² is provided just outside of the still with a perforated or reticulated section, $d$, which is surrounded by a small receptacle, $d'$, from which a conducting-pipe leads off to the desired point. In this arrangement the mash is forced out of the still through the pipe B², and before it has had time to cool passes through the section $d$ of the pipe. The steam-pressure behind forcing the material out prevents the clogging of the perforated or reticulated section $d$, and at the same time forces the spent beer, with its valuable properties in solution, through these perforations into the receptacle $d'$, while the slop passes on through the pipe B², as before described. This modification, while embodying the principle of a separation under pressure, is not as desirable as the one previously described, where the separation is performed entirely within the still, because a slight cooling of the material must take place in the passage through the outlet-pipe before separation, and the steam has not the same chance to keep the material agitated, and thus prevent settling.

Having thus fully described my invention, what I claim as new, and desire to secure by Letters Patent, is—

1. The process of separating the slop from the spent beer in the manufacture of whisky, which consists in separating them by sieving under pressure while in a heated state, substantially as described and shown.

2. The process of separating the slop from the spent beer in the manufacture of whisky, which consists in separating them by forcing through a perforated or reticulated cylinder under steam-pressure, substantially as described and shown.

3. The process of separating the slop from the spent beer in the manufacture of whisky, which consists in separating them by forcing through a sieve or similar device under steam-pressure before they leave the still, substantially as and for the purpose shown and described.

In testimony whereof I affix my signature in presence of two witnesses.

FRANCIS M. YOUNG.

Witnesses:
W. C. McARTHUR,
CHAS. KRESSMANN.